United States Patent
Chung et al.

(10) Patent No.: US 11,621,613 B2
(45) Date of Patent: Apr. 4, 2023

(54) ELECTRIC MOTOR AND ELECTRIC TOOL

(71) Applicant: TECHWAY INDUSTRIAL CO., LTD., Taichung (TW)

(72) Inventors: Fu-Hsiang Chung, Taichung (TW);
Hong Fang Chen, Taichung (TW);
Wei-Ting Chen, Taichung (TW);
Wei-Lin Hsu, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 433 days.

(21) Appl. No.: 16/880,815

(22) Filed: May 21, 2020

(65) Prior Publication Data
US 2021/0028671 A1 Jan. 28, 2021

(30) Foreign Application Priority Data

Jul. 22, 2019 (TW) .................................. 108125882

(51) Int. Cl.
| | | |
|---|---|---|
| *H02K 11/21* | (2016.01) | |
| *H02K 11/215* | (2016.01) | |
| *H02K 7/14* | (2006.01) | |
| *H02K 9/22* | (2006.01) | |
| *H02K 11/33* | (2016.01) | |
| *B25F 5/00* | (2006.01) | |
| *H02K 11/00* | (2016.01) | |

(52) U.S. Cl.
CPC ............ *H02K 11/215* (2016.01); *B25F 5/008* (2013.01); *H02K 7/145* (2013.01); *H02K 9/22* (2013.01); *H02K 11/0094* (2013.01); *H02K 11/33* (2016.01); *H02K 2211/03* (2013.01)

(58) Field of Classification Search
CPC ..... B25F 5/008; H02K 1/148; H02K 11/0094; H02K 11/215; H02K 11/33; H02K 2203/09; H02K 2211/03; H02K 3/522; H02K 5/225; H02K 7/145; H02K 9/22
See application file for complete search history.

(56) References Cited

U.S. PATENT DOCUMENTS

| | | | |
|---|---|---|---|
| 2015/0069864 A1* | 3/2015 | Nagahama | ............... H02K 5/04 310/50 |
| 2016/0226339 A1* | 8/2016 | Niwa | ....................... H02K 5/08 |

FOREIGN PATENT DOCUMENTS

WO    WO-2011159674 A1 * 12/2011   ............. H02K 11/20

* cited by examiner

*Primary Examiner* — Naishadh N Desai
(74) *Attorney, Agent, or Firm* — Guice Patents PLLC

(57) ABSTRACT

The present invention relates to an electric motor and an electric tool equipped with the electric motor. The electric motor includes a rotor, a stator, a coil module wound around the stator, a Hall unit and a wiring circuit unit. The Hall unit includes a Hall circuit board disposed around a rotating shaft of the rotor, and a Hall module for sensing rotation of the rotor. The wiring circuit unit is independent of the Hall circuit board and includes a three-phase power source interface. The wiring circuit unit electrically connects coils of the coil module to the power source interfaces respectively by groups. By separately disposing the Hall unit and the wiring circuit unit independently, a volume of the Hall circuit board can be reduced, and an area blocking an airflow path of a heat dissipation unit can be reduced, so heat dissipation effect of the electric motor and the electric tool can be improved.

23 Claims, 16 Drawing Sheets

ELECTRIC MOTOR AND ELECTRIC TOOL

BACKGROUND OF THE INVENTION

Field of Invention

The present invention relates to components of electric drive, and more particularly refers to an electric motor and an electric tool equipped with the electric motor.

Related Art

Electric tools such as electric impact wrenches, electric drill bits, electric screwdrivers, etc. are all commonly used decoration tools. Please refer to FIGS. 1 and 2, the basic framework of a conventional electric tool includes an electric motor 11, a fan 12, a circuit board 13 disposed corresponding to the electric motor 11, three Hall elements 14, and a wiring module 15 with a three-phase power source interface 151.

The electric motor 11 has a rotor 111, a stator 112 surrounding the rotor 111, and a plurality of coils (not shown in the figures) wound around the stator 112.

The circuit board 13 is provided for disposing the Hall elements 14 and the wiring module 15. The Hall elements 14 are provided at an inner circle of the circuit board 13 and used to sense rotation of the rotor 111. The wiring module 15 is provided at an outer circle of the circuit board 13 and electrically connected to the coils to set electrical connection relationship of the coils, so that the coils are electrically connected to the three-phase power source interface 151 respectively by groups.

However, since an outer diameter of the circuit board 13 needs to be large enough to allow the wiring module 15 to be conveniently electrically connected to the coils pulled out from the stator 112, and an inner diameter of the circuit board 13 needs to be small enough to allow the Hall elements 14 to be close to sense rotation of the rotor 111, a distance from the inner diameter to the outer diameter is long, and a volume of the circuit board 13 is large. Because the Hall elements 14 need to be close to the rotor 111 to obtain a better induction effect, plus the positions of the Hall elements 14 are exactly blocking an airflow path provided by the fan 12, the electric motor 11 is poorly ventilated on a side close to the circuit board 13, resulting in poor heat dissipation effect of the electric motor 11.

In addition, except for controlling by means of software, the structure of the conventional electric motor cannot adjust rotation speed.

SUMMARY OF THE INVENTION

An object of the present invention is to provide an electric motor and an electric tool capable of improving heat dissipation effect.

Another object of the present invention is to provide an electric motor and an electric tool capable of adjusting rotation speed of the electric motor without replacing hardware equipment.

The electric motor provided by the present invention includes:
 a rotor with a rotating shaft;
 a stator surrounding the rotor;
 a coil module with a plurality of coils wound around the stator;
 a Hall unit including a Hall circuit board disposed around the rotating shaft, and a Hall module disposed on the Hall circuit board and corresponding to the rotor and used to sense rotation of the rotor; and
 a wiring circuit unit independent of the Hall circuit board and including a three-phase power source interface, the wiring circuit unit is electrically connected to the coils and electrically connects the coils to the power source interfaces respectively by groups.

The electric tool provided by the present invention includes a housing unit, a battery unit, the electric motor, a heat dissipation unit, and a control unit;
 the battery unit is disposed at a lower side of the housing unit;
 the electric motor is installed in the housing unit, the Hall unit and the heat dissipation unit are spaced apart along a longitudinal direction of the rotating shaft; and
 the control unit is disposed in the housing unit and electrically connected to the battery unit, the electric motor and the Hall unit, and located between the electric motor and the battery unit.

The efficacies of the present invention lie in: by separately disposing the Hall unit and the wiring circuit unit independently, a volume of the Hall circuit board can be reduced, and an area blocking an airflow path provided by the heat dissipation unit can be reduced, so heat dissipation effect of the electric motor and the electric tool can be improved.

Another feature of the structural design of the present invention lies in: when assembling the electric motor, a setting angle of the Hall circuit board can be changed, thereby rotation speed of the motor can be adjusted without replacing any parts or hardware equipment.

BRIEF DESCRIPTION OF THE DRAWINGS

The objects, features and efficacies of the present invention can be clearly understood from the description of the following preferred embodiments with reference to the accompanying drawings.

DETAILED DESCRIPTION OF THE INVENTION

Before the present invention is described in detail, it should be noted that in the following description, similar elements are denoted by a same number.

Figure 4:
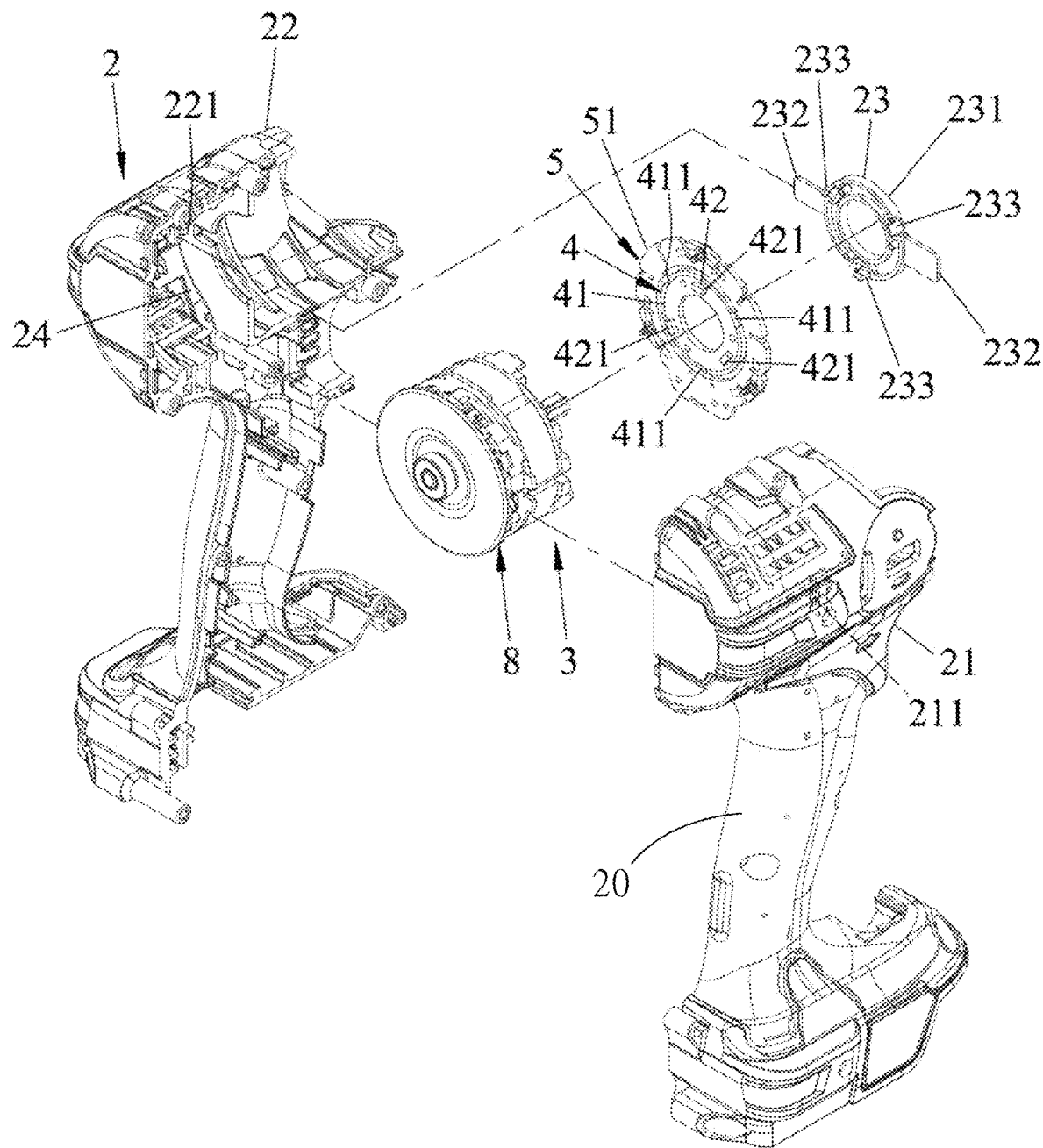
FIG. 4 is an incomplete exploded perspective view of the electric tool and an electric motor thereof of the first preferred embodiment of the present invention.
Figure 5:
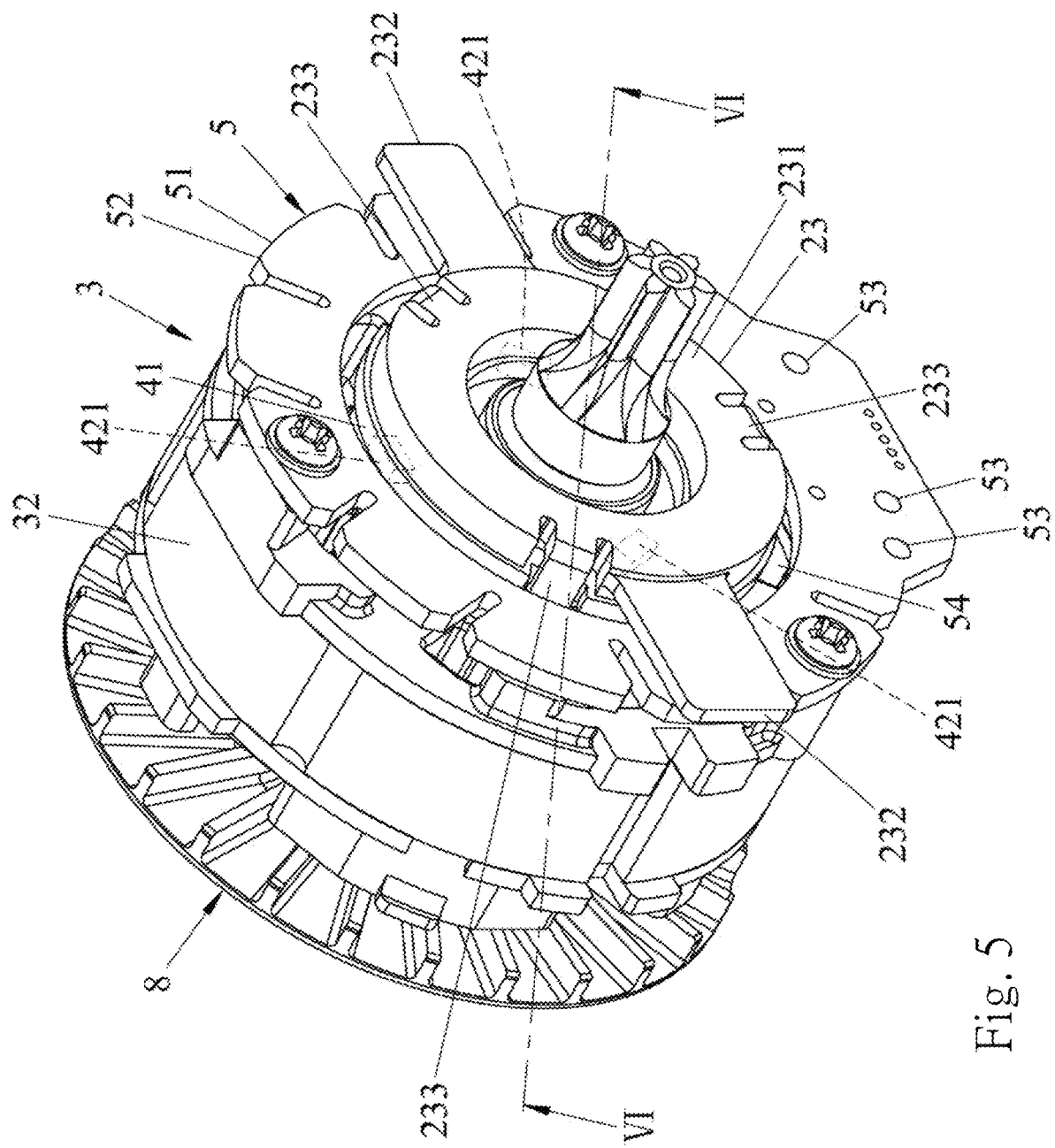
FIG. 5 is an incomplete perspective view of the electric motor of the first preferred embodiment.
Figure 7:
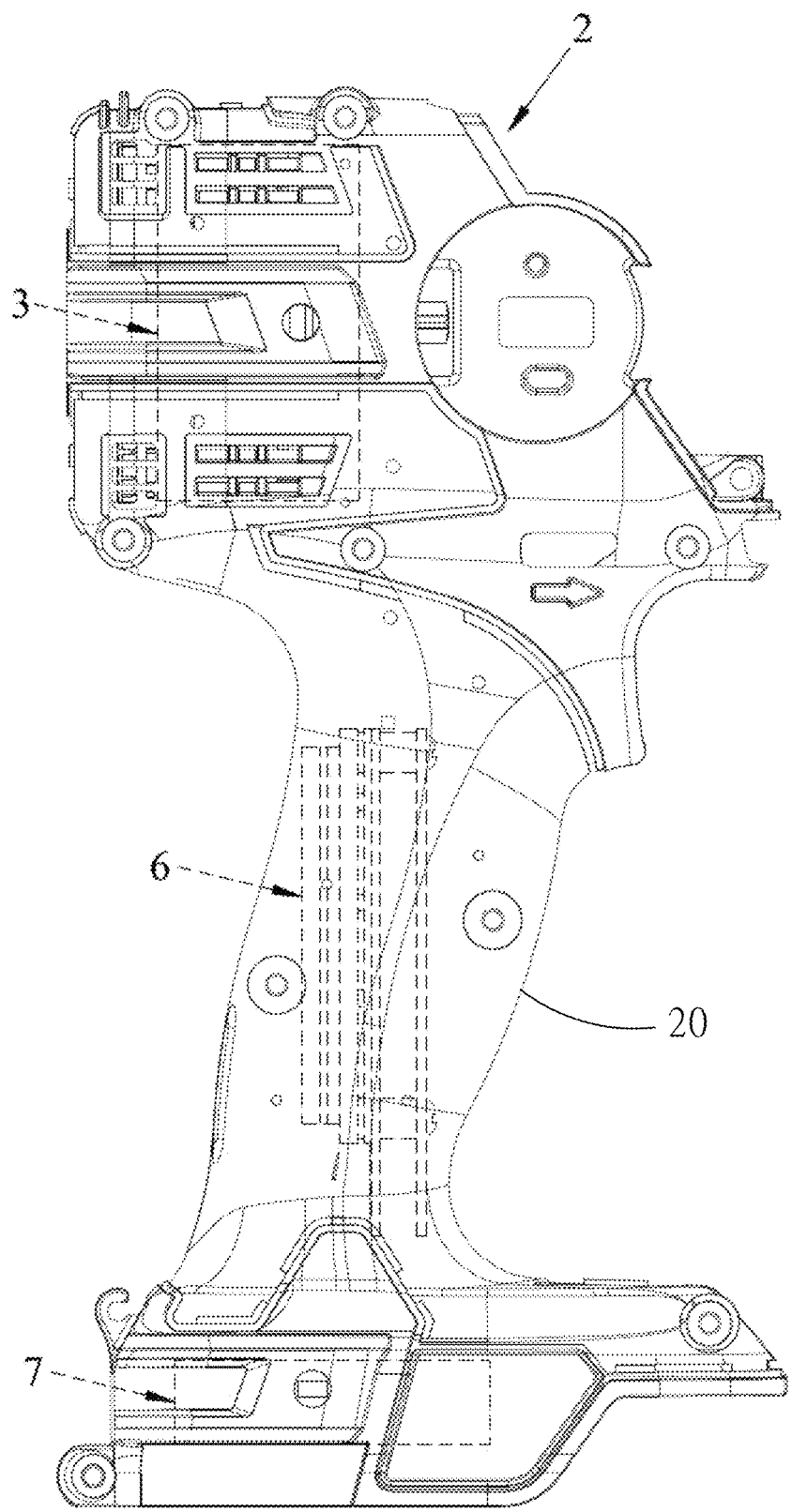
FIG. 7 is an incomplete schematic diagram of the first preferred embodiment to illustrate a disposing position of a control unit.
Figure 15:
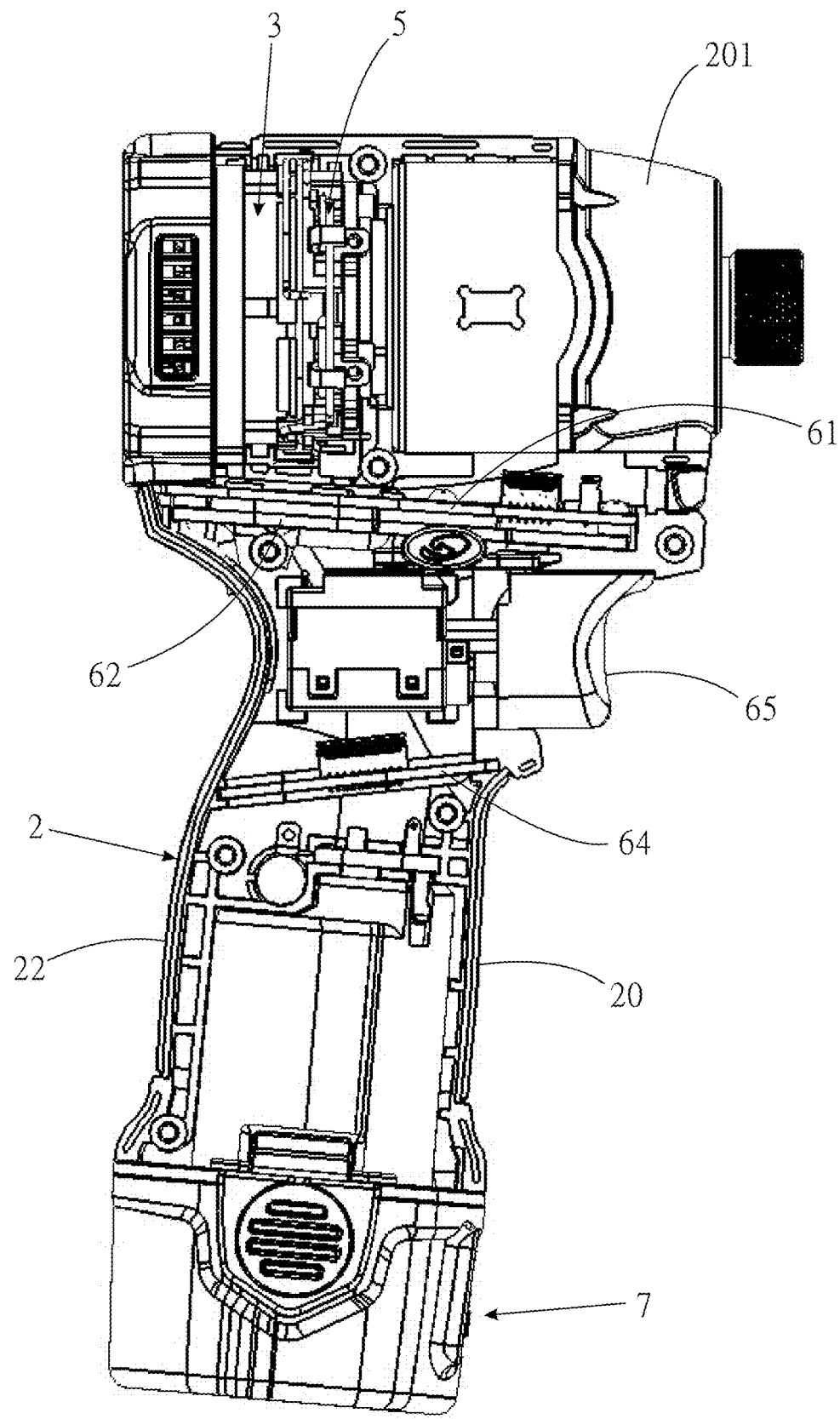
FIG. 15 is an incomplete view of a third preferred embodiment of the electric tool of the present invention.

Please refer to FIGS. 4, 5 and 7 for a first preferred embodiment of an electric tool of the present invention including a housing unit 2, an electric motor 3, a Hall unit 4, a wiring circuit unit 5, a control unit 6, a battery unit 7, a heat dissipation unit 8, and a tool head 201 provided in the housing unit 2 and driven by the electric motor 3, as shown in FIG. 15, the tool head 201 is caused to generate rotational output to rotate a workpiece. Among the above components, the tool head is not a technical feature of the present invention, so it will not be described here.

Figure 1:
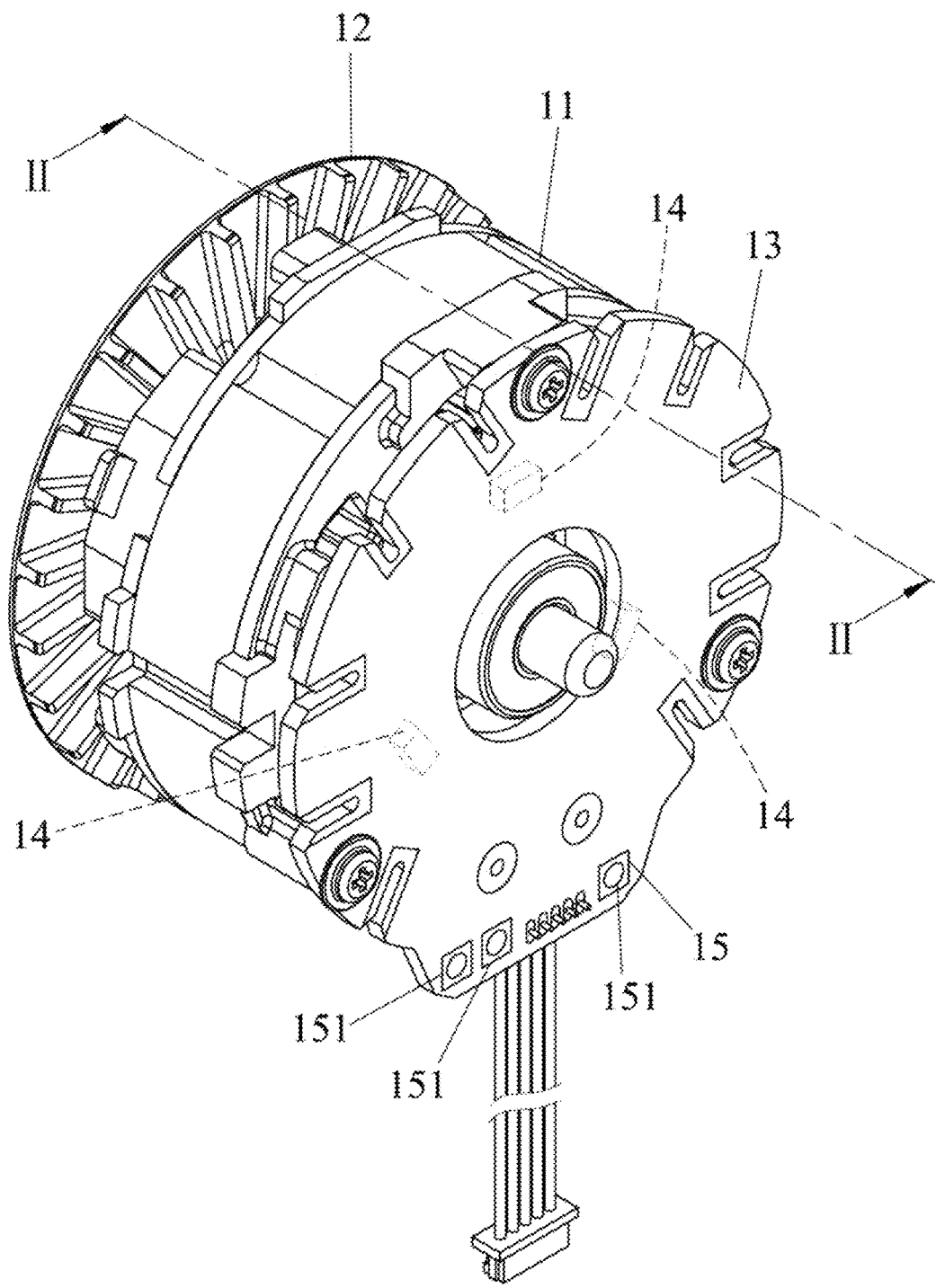
FIGS. 1 and 2 are perspective view and partial cross-sectional view of a basic framework of a conventional electric tool.
Figure 2:
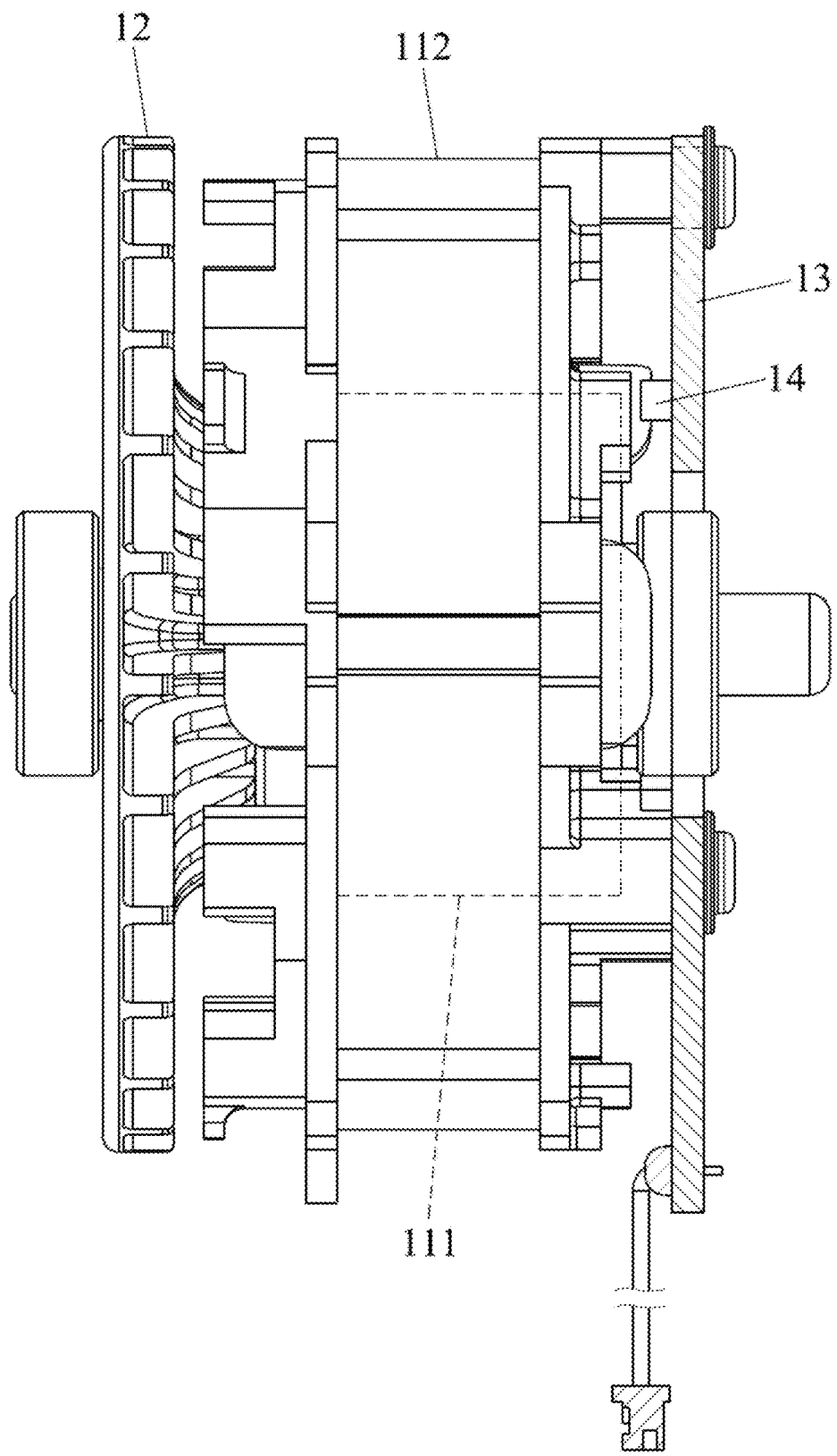
Figure 3:
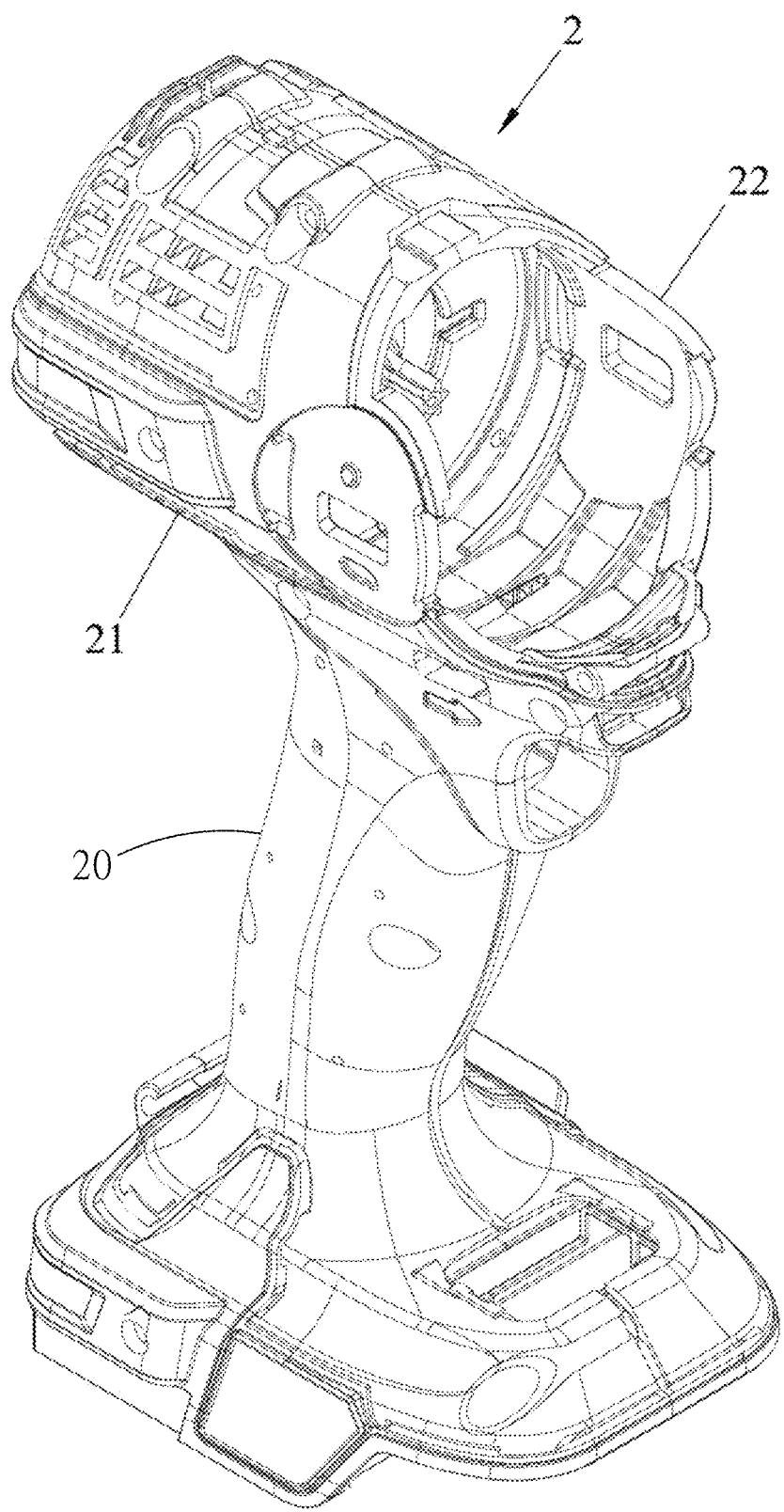
FIG. 3 is an incomplete perspective view of a first preferred embodiment of an electric tool of the present invention.

Please refer to FIGS. 3, 4 and 5. The housing unit 2 includes a first housing 21, a second housing 22 that cooperates with the first housing 21 to define a disposition space 24 for disposing the electric motor 3, the Hall unit 4 and the wiring circuit unit 5, and a bracket 23 disposed in the first housing 21 and the second housing 22 and provided for disposing the Hall unit 4.

The first housing 21 and the second housing 22 respectively have a bracket groove 211 and a bracket groove 221 for engaging with two ends of the bracket 23.

The bracket 23 has a ring-shaped main portion 231 for disposing a Hall circuit board 41 of the Hall unit 4, and two bracket portions 232 extending outwardly from the main portion 231 and respectively engaging in the bracket grooves 211, 221 of the first housing 21 and the second housing 22. The main portion 231 has a plurality of hook members 233. Wherein, the bracket 23 can also include three, four or more than five of the bracket portions 232 according to actual needs, which is not limited thereto.

Figure 6:
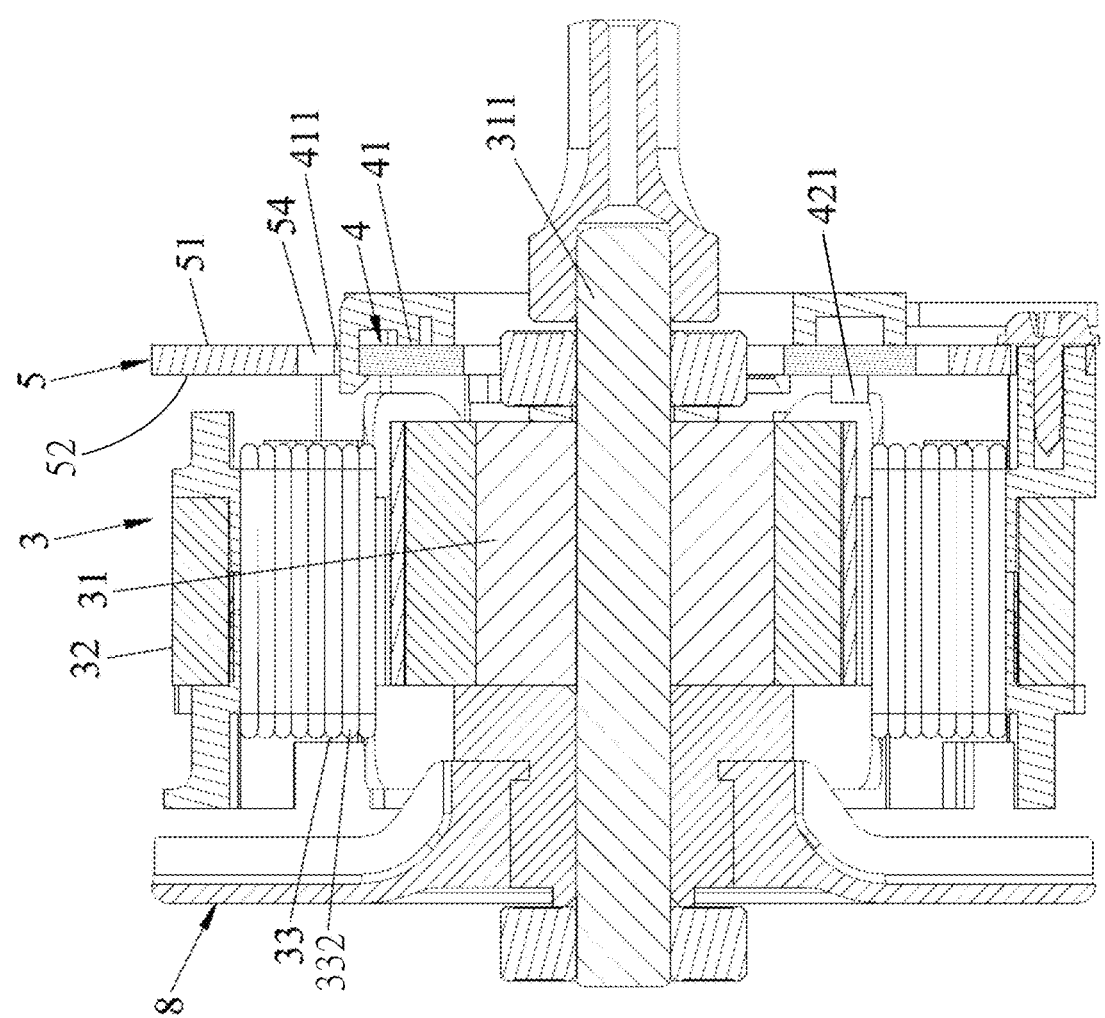
FIG. 6 is a cross-sectional view taken along line VI-VI in FIG. 5.

Please refer to FIGS. 4, 5 and 6. The electric motor 3 includes a rotor 31 having a rotating shaft 311, a stator 32 surrounding the rotor 31, and a coil module 33 having a plurality of coils 332 wound around the stator 32.

The Hall unit 4 and the heat dissipation unit 8 are spaced apart along a longitudinal direction of the rotating shaft 311. The Hall unit 4 includes the Hall circuit board 41 surrounding the rotating shaft 311 and disposed in the housing unit 2, and a Hall module 42 disposed on the Hall circuit board 41 and corresponding to the rotor 31 and used to sense rotation of the rotor 31. The Hall circuit board 41 has a plurality of grooves 411 for engaging with the hook members 233 respectively. The Hall module 42 has three Hall elements 421 disposed adjacent to the rotor 31.

The wiring circuit unit 5 includes a wiring circuit board 51 independent of the Hall circuit board 41 and surrounding the rotating shaft 311, a wiring circuit 52 provided on the wiring circuit board 51, and a three-phase power source interface 53 disposed on the wiring circuit board 51. The wiring circuit 52 is electrically connected to the coils 332 of the coil module 33 and electrically connects the coils 332 to the power source interfaces 53 respectively by groups. The power source interfaces 53 are used to receive three-phase power input. In this embodiment, the wiring circuit board 51 is ring-shaped and disposed around a periphery of the Hall circuit board 41 by spacing apart with a gap 54, but the wiring circuit board 51 and the Hall circuit board 41 can also be spaced apart along a longitudinal direction of the rotating shaft 311, although disposing in such a way increases length and volume of the electric motor 3, better ventilation and heat dissipation effects can be obtained.

Please refer to FIGS. 5, 6 and 7. The control unit 6 is disposed in the housing unit 2 at a grip 20 formed by the housing unit 2, and electrically connected to the electric motor 3, the Hall unit 4 and the battery unit 7, and located between the electric motor 3 and the battery unit 7. The control unit 6 has a circuit unit including a printed circuit board (PCB), a plurality of power switching elements (not shown in the figures). A tact switch (not shown in the figures) is electrically connected to the control unit 6 for signal-transmission. The Hall circuit board 41 and the wiring circuit board 51 are also electrically connected to the circuit unit of the control unit 6. The circuit unit of the control unit 6 includes a drive loop (first loop circuit) disposed with the power switching elements, and a control loop (second loop circuit). The power switching element can be a MOSFET transistor (metal oxide semiconductor field effect transistor) or an IGBT transistor (insulated gate bipolar transistor) disposed on the printed circuit board of the control unit 6. The power switching elements in the drive loop control operation of the electric motor 3; the control loop controls the ON/OFF of the power switching elements in the drive loop. Thereby, the control unit 6 switches ON/OFF of the power switching elements according to signals detected by the Hall module 42 to control operation of the electric motor 3.

The battery unit 7 is disposed at a lower side of the housing unit 2, preferably under a position where a user holds on, and used to provide power. The battery unit 7 supplies power to the control loop and the drive loop of the control unit 6 and other electronic components requiring power, such as LED lights and liquid crystal screens, etc. Press the tact switch to start or stop the electric tool.

The heat dissipation unit 8 corresponds to the electric motor 3 and is disposed inside the housing unit 2, and is disposed on a side of the electric motor 3 opposite to the Hall unit 4 and the wiring circuit unit 5 to provide the electric motor 3 with airflow for heat dissipation. Wherein, the heat dissipation unit 8 is preferably a fan.

Please refer to FIG. 4, FIG. 5 and FIG. 6, through the above description, the advantages of this embodiment can be summarized as follows:

By separately disposing the Hall unit 4 and the wiring circuit unit 5 independently, a volume of the Hall circuit board 41 can be reduced, and an area blocking an airflow path provided by the heat dissipation unit 8 can be reduced, so heat dissipation effect of the electric motor 3 can be improved.

Furthermore, by disposing the wiring circuit 52 on the wiring circuit board 51 independent of the Hall circuit board 41, both the Hall circuit board 41 and the wiring circuit board 51 can be made into circuit boards with a small volume. As shown in FIG. 6, even though the Hall circuit board 41 and the wiring circuit board 51 are disposed on a same side (front side) of the electric motor 3 and are disposed in inner and outer circles in order to reduce a longitudinal length and a volume of the electric motor 3, the gap 54 (a gap formed between an inner periphery of the wiring circuit board 51 and an outer periphery of the Hall circuit board 41) is still provided between the Hall circuit board 41 and the wiring circuit board 51 to circulate airflow, which has an excellent heat dissipation effect compared to the conventional techniques.

Figure 8:
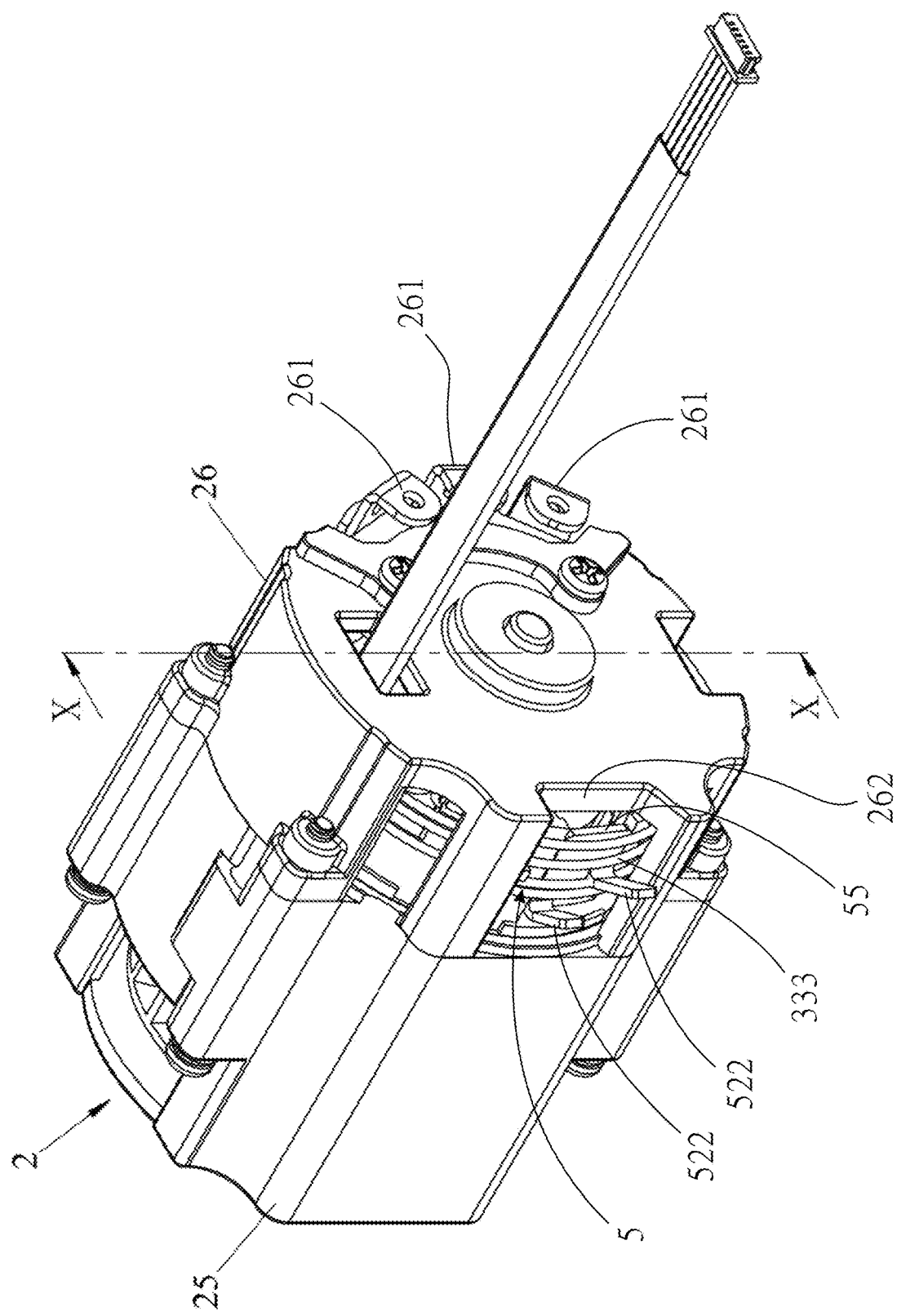
FIGS. 8 and 9 are incomplete perspective view and exploded perspective view of a second preferred embodiment of the electric tool and the electric motor thereof of the present invention.
Figure 9:
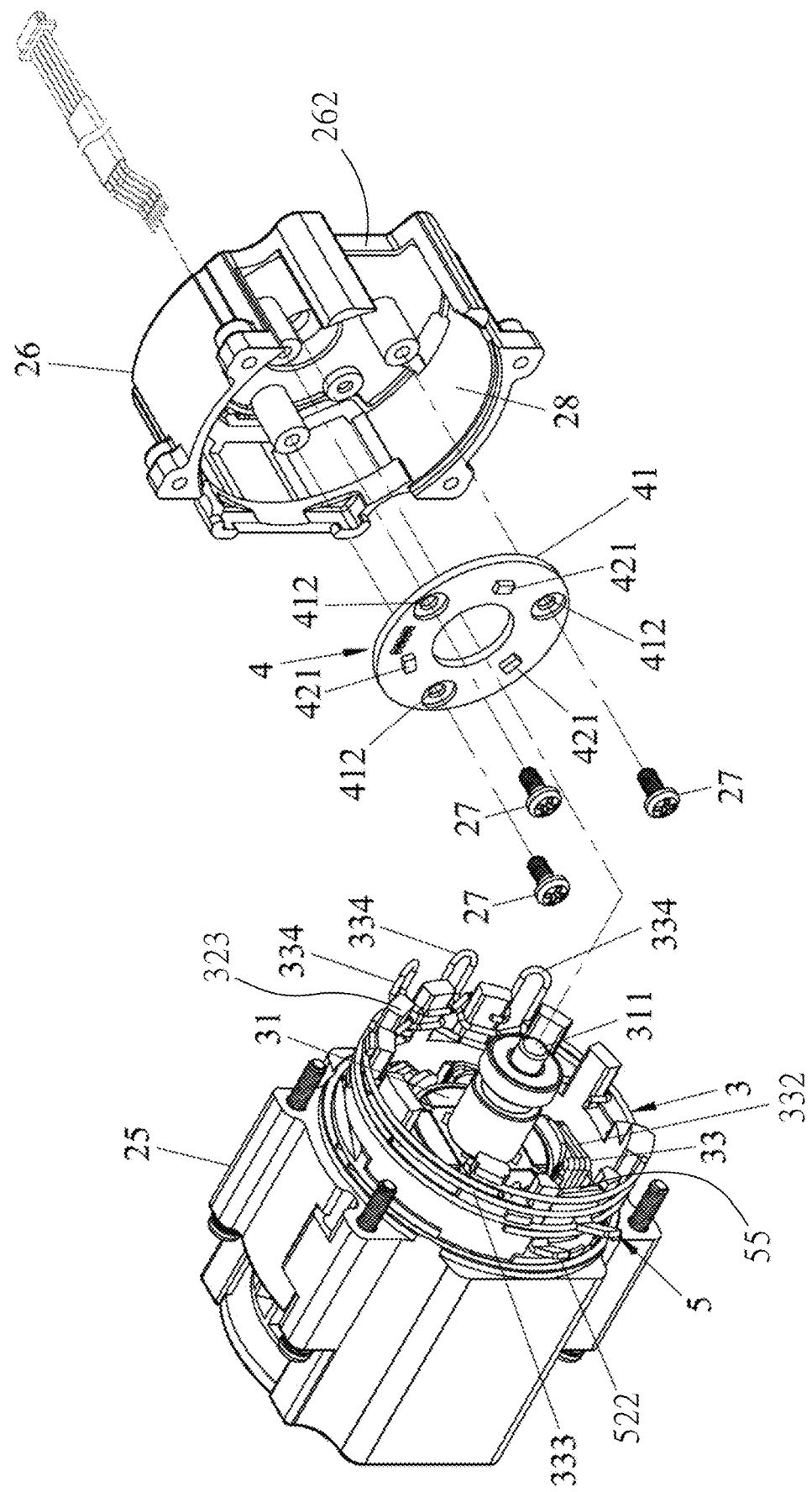
Figure 10:
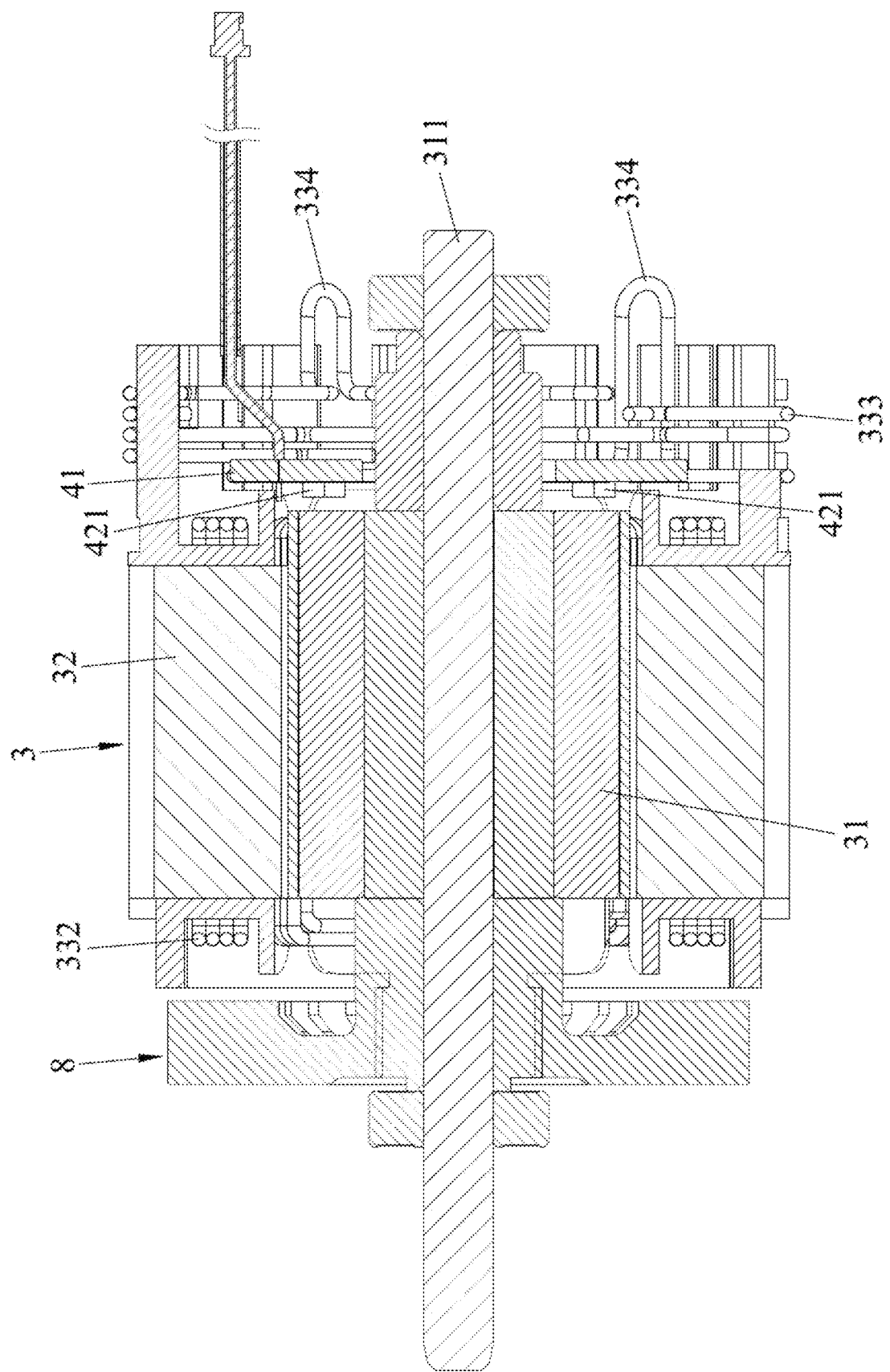
FIG. 10 is a cross-sectional view of the electric motor of the second preferred embodiment along line X-X in FIG. 8.

Please refer to FIGS. 8, 9 and 10 for a second preferred embodiment of the electric tool of the present invention. This embodiment is similar to the first embodiment, and the differences from the first embodiment lie in:

The housing unit 2 includes a first motor cover and a second motor cover cooperating with each other, such as a motor front cover 25 and a motor rear cover 26, and a motor space 28 is defined between the motor front cover 25 and the motor rear cover 26 for disposing the electric motor 3 and the Hall unit 4. The Hall circuit board 41 is installed inside either the motor front cover 25 or the motor rear cover 26. In this embodiment, the Hall circuit board 41 is penetrated by a plurality of positioning members 27 to assemble the Hall circuit board 41 inside the motor rear cover 26, wherein each of the positioning members 27 is preferably a screw, which can be loosened, tightened and removed by rotating.

Figure 11:
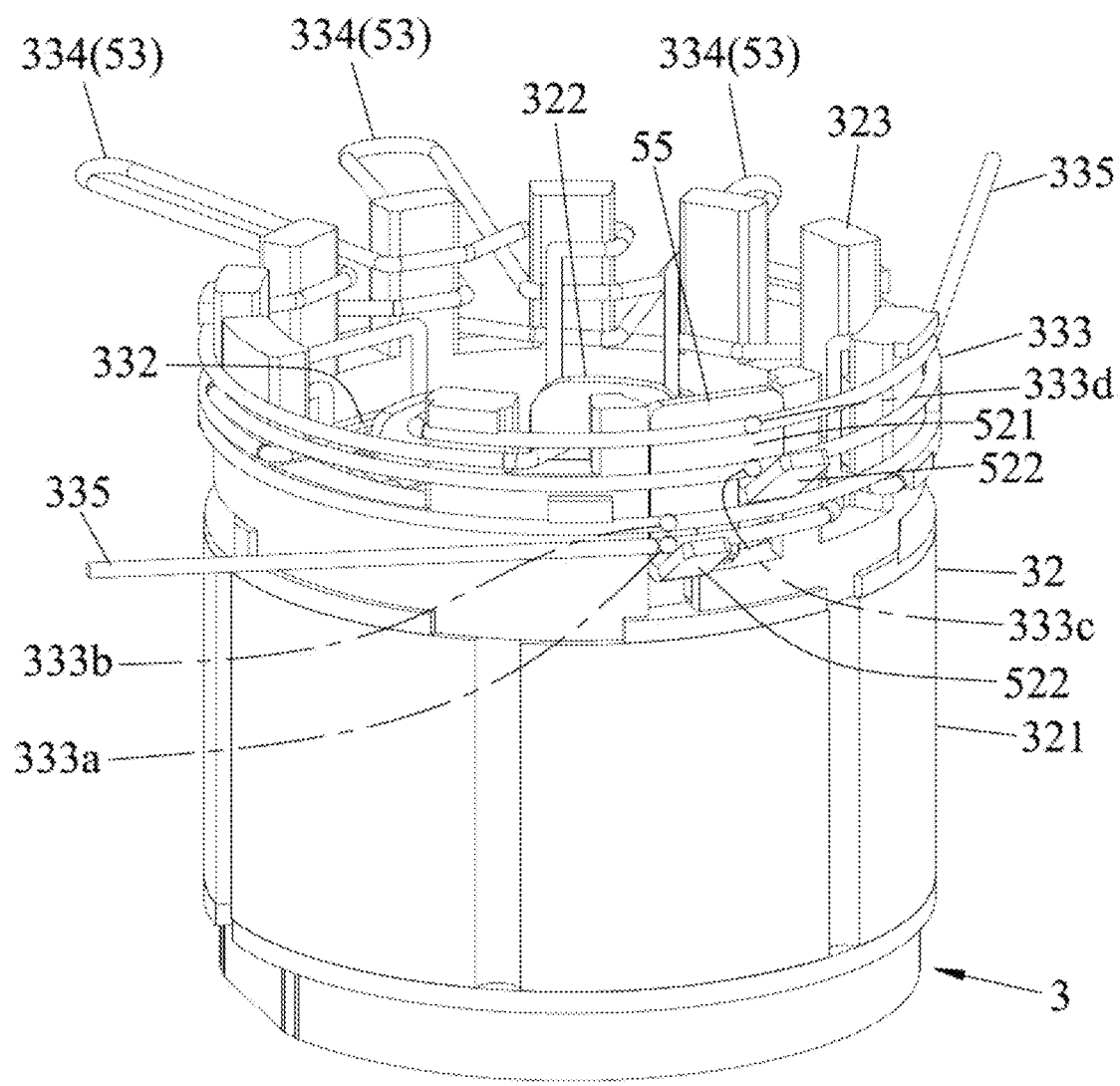
FIGS. 11 and 12 are incomplete schematic diagrams of the electric motor of the second preferred embodiment to illustrate a winding method of a coil module.
Figure 12:
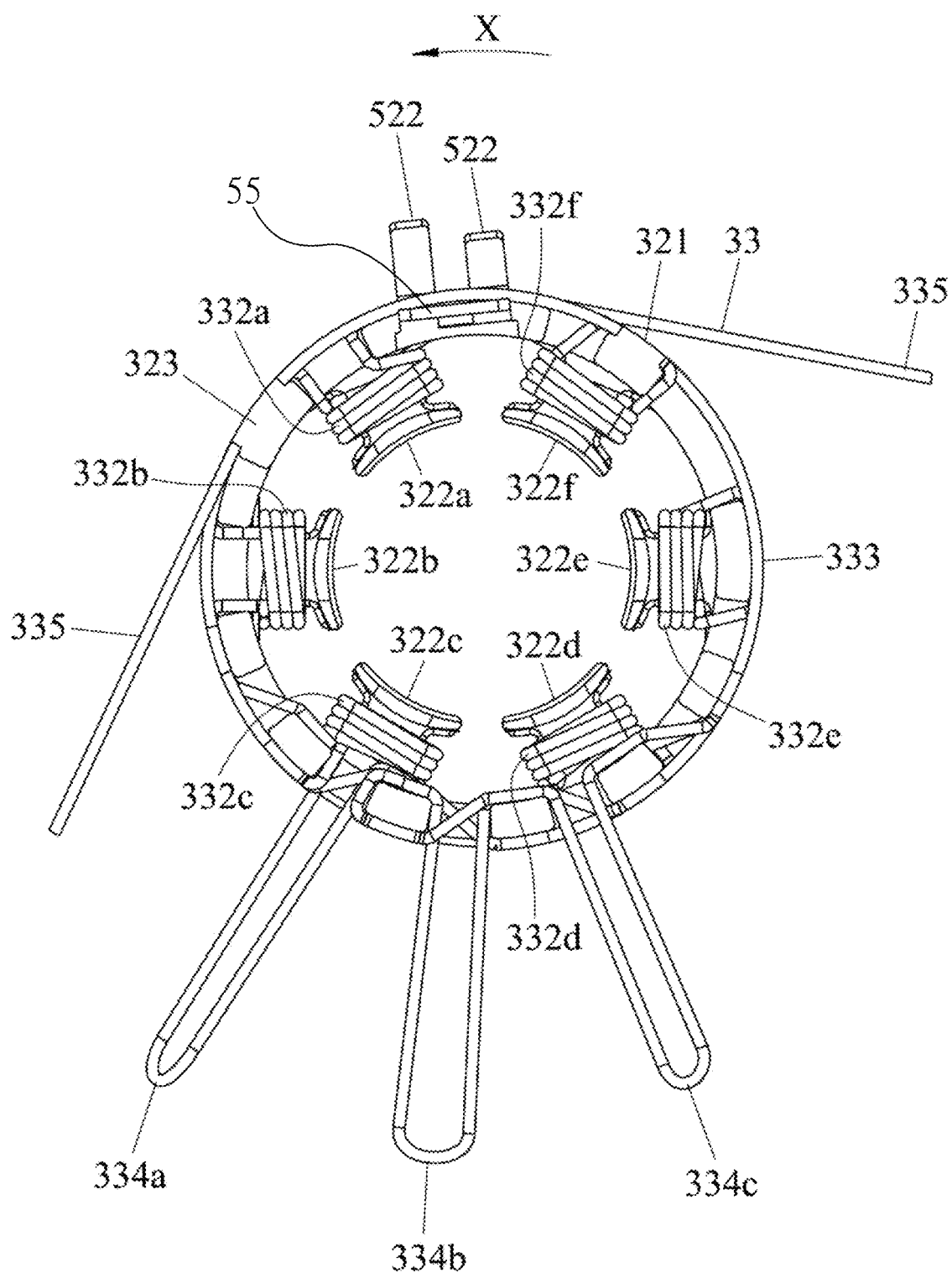

Please refer to FIGS. 9, 11 and 12. The stator 32 has a cylindrical yoke 321, six polar columns 322 annularly disposed on an inner circumferential surface of the yoke 321 at an appropriate angle (for example, at equal intervals), and a winding frame portion 323 disposed at one end of the yoke 321 along a longitudinal direction of the yoke 321. For clear explanation, the polar columns 322 are respectively indicated as 322*a* to 322*f* according to a winding direction X in FIG. 12.

The coil module 33 has the six coils 332 wound around the polar columns 322 respectively, a surrounding portion 333 connected to the coils 332 and wound around the winding frame portion 323, and three wiring portions 334 extending from the surrounding portion 333 and serving as the power source interfaces 53 respectively. For clear explanation, the coils 332 are respectively indicated as 332*a* to 332*f* according to the winding direction X in FIG. 12, and the wiring portions 334 are respectively indicated as 334*a* to 334*c* according to the winding direction X in FIG. 12. Wherein, when the electric motor 3 is not yet assembled, the coil module 33 further has two free ends 335, the two free ends 335 will be cut off after the electric motor 3 is assembled.

In this embodiment, quantities of the polar columns 322 and the coils 332 are six, but those having ordinary skill in the art can also change the quantities of poles to 12, 24, 36, etc. common to three-phase motors according to actual needs, which are not limited thereto.

The Hall circuit board 41 is disposed inside the motor rear cover 26 corresponding to the rotor 31, and has a plurality of through holes 412 for the positioning members 27 to pass through.

The wiring circuit unit 5 further includes a short-circuiting plate 55 disposed on the winding frame portion 323. The short-circuiting plate 55 is clamped on the surrounding portion 333 to electrically connect the coils 332. The short-circuiting plate 55 preferably has a setting portion 521 provided on the winding frame portion 323, and two clamping portions 522 extending from the setting portion 521 and used for clamping the surrounding portion 333. Preferably, the short-circuiting plate 55 is electrically connected to the surrounding portion 333 through contact method of spot welding or clamping, and thereby the coils 332 are electrically connected.

The coils 332 of the electric motor 3 are manufactured with winding method by using a conductive wire. The wire winding method first starting from the free end 335 on the right side in FIG. 12, entering from a position of the short-circuiting plate 55 along the winding direction X, and then sequentially winding around the polar column 322*a*, forming the wiring portion 334*a*, winding around the polar column 322*d*, and then passing the short-circuiting plate 55, winding around the polar column 322*b*, forming the wiring portion 334*b*, winding around the polar column 322*e*, and then passing the short-circuiting plate 55, winding around the polar column 322*c*, forming the wiring portion 334*c*, winding around the polar column 322*f*, passing the short-circuiting plate 55, and finally forming the free end 335 on the left side in FIG. 12. In detail, based on the direction X, the wire is first wound around the first polar column 322*a* and the fourth polar column 322*d* and forms the first wiring portion 334*a*, and then wound around the second polar column 322*b* and the fifth polar column 322*e* and forms the second wiring portion 334*b*, and finally wound around the third polar column 322*c* and the sixth polar column 322*f* and forms the third wiring portion 334*c*. Wherein, for clear explanation, as shown in FIG. 11, the surrounding portion 333 of the wire winds and passes the short-circuiting plate 55 four times, and the surrounding portion 333 forms four contacts on the short-circuiting plate 55, which are respectively indicated as 333*a*~333*d* according to the winding sequence.

Figure 13:
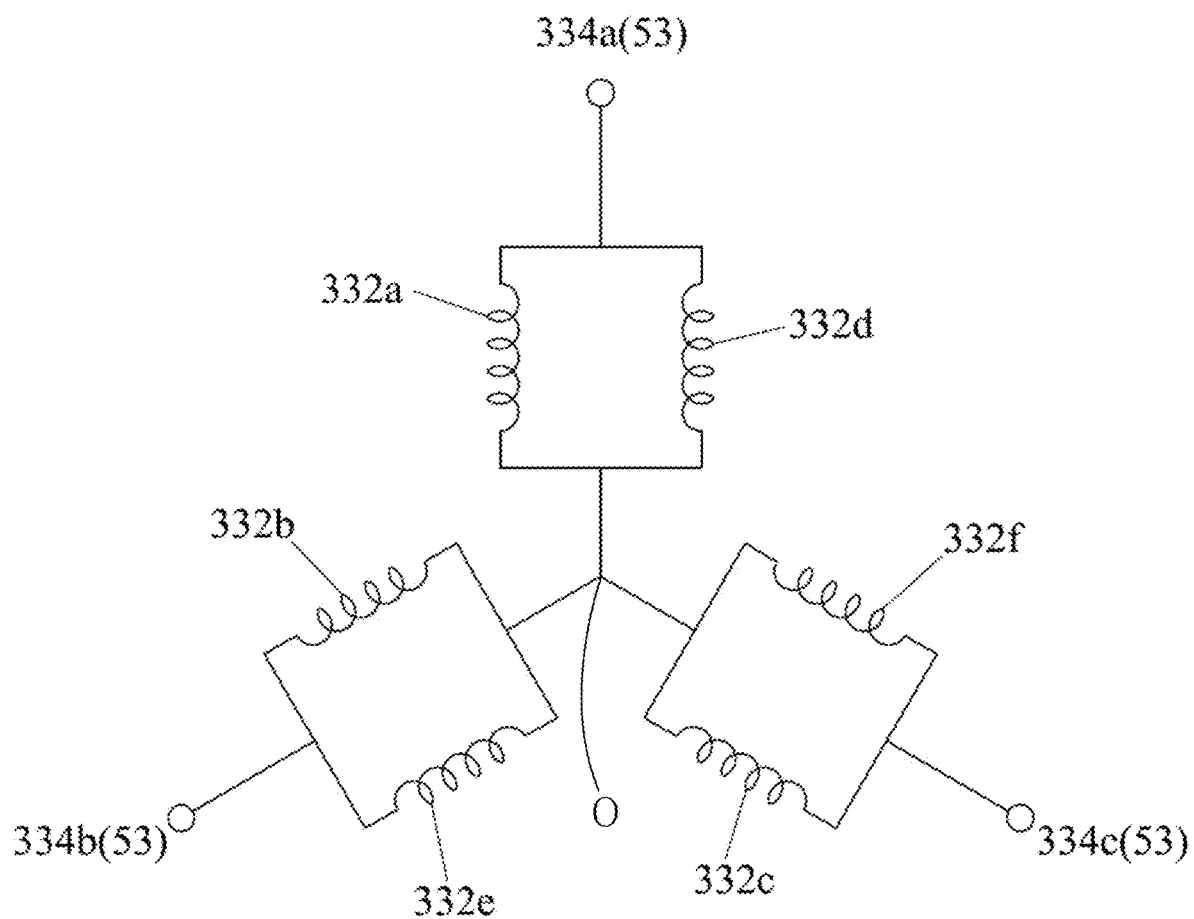
FIG. 13 is a schematic circuit diagram of the coil module of the second preferred embodiment.

After winding of the coil module 33 is completed, upwardly clamp the clamping portions 522 of the short-circuiting plate 55 on the surrounding portion 333, and the four contacts 333*a* to 333*d* on the surrounding portion 333 are electrically connected by spot welding in such a way that the coil module 33 can be formed into a Y-shaped connection as shown in FIG. 13, wherein the short-circuiting plate 55 is a central connection point O of the Y-shaped connection.

Please refer to FIGS. 9, 10 and 11. The second preferred embodiment is not only capable of improving heat dissipation effect of the electric motor 3 by separately disposing the Hall unit 4 and the wiring circuit unit 5 independently to reduce a volume of the Hall circuit board 41, and reduce an area blocking an airflow path provided by the heat dissipation unit 8, also capable of greatly increasing an amount of air that can be circulated to obtain better heat dissipation effect by disposing the short-circuiting plate 55 to electrically connect with the coils 332 by using the above-mentioned winding method, and by using the wiring portions 334 as the three-phase power source interface 53 of the electric motor 3 to omit disposition of the wiring circuit board 51 (referring to FIG. 4) in the first preferred embodiment in such a way that only the Hall circuit board 41 is left on an air passage of the heat dissipation unit 8.

Please refer to FIG. 8. The motor rear cover 26 is provided with three conductive plates 261 respectively electrically connected to the three wiring portions 334 (53), so that after the electric motor 3 is installed in the motor front and rear covers 25, 26, it is convenient to connect circuitry through the three conductive plates 216. In addition, the motor rear cover 26 is provided with an opening 262 for exposing the short-circuiting plate 55, the clamping portions 522 and the surrounding portion 333.

Figure 14:
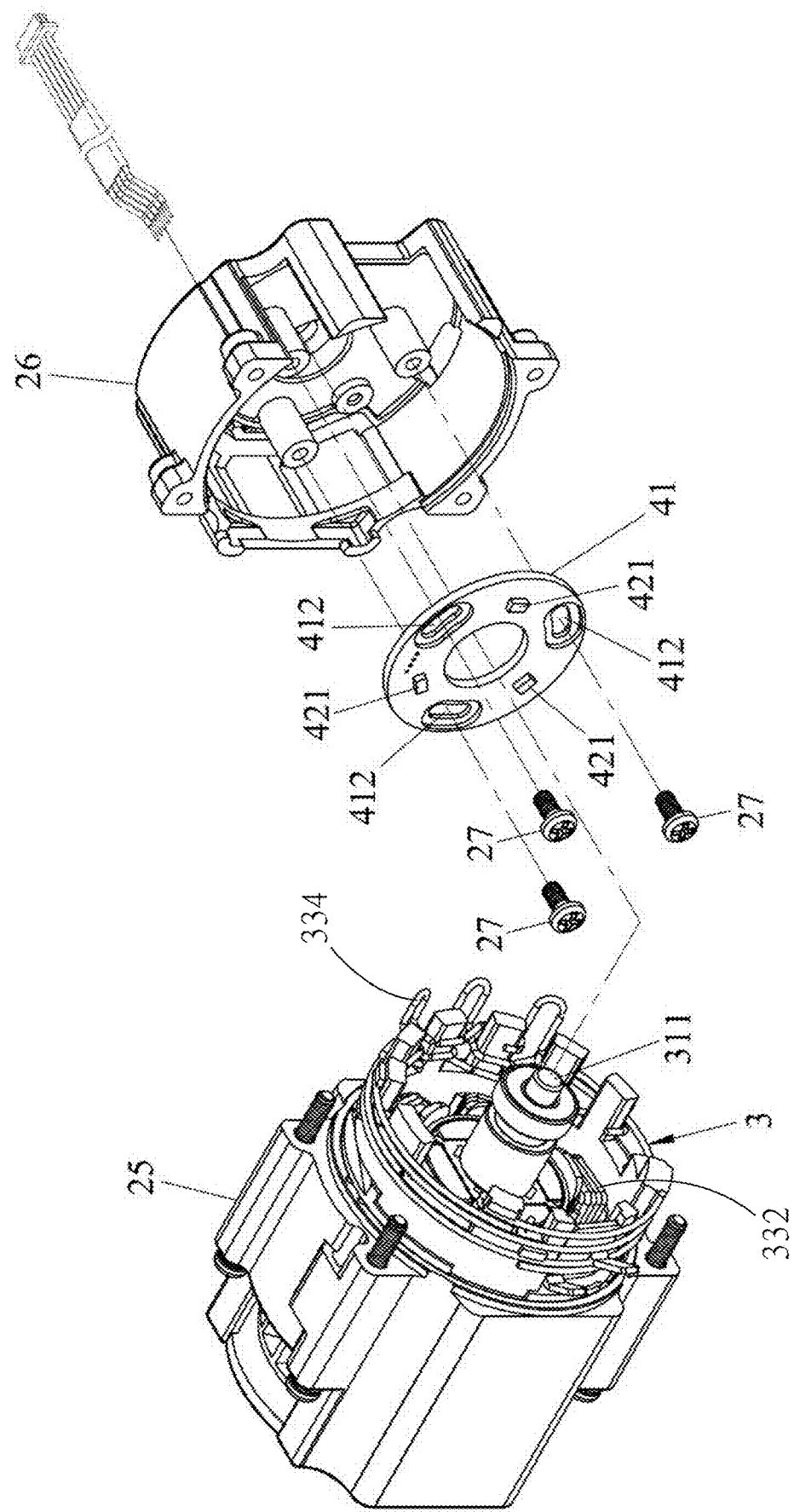
FIG. 14 is an incomplete exploded perspective view of the electric motor of the second preferred embodiment to illustrate another mode of a Hall circuit board.

Please refer to FIG. 14 for another embodied mode of the Hall circuit board 41. In this mode, an extended length of each of the through holes 412 around the rotating shaft 311 is greater than a radial width of the corresponding positioning member 27. Thereby, a setting angle of the Hall circuit board 41 can be finely adjusted clockwise or counterclockwise during assembly, that is, an angular position of the Hall circuit board 41 relative to the yoke 321 of the stator 32 can be adjusted, so that a switching angle of the electric motor 3 can be changed to change a rotation speed of the electric motor 3, and an adjustment range of the rotation speed is about 5~10%. In this way, the effect of fine-tuning the rotation speed can be achieved by adjusting the setting angle of the Hall circuit board of 41 without replacing any hardware equipment. In practical applications, a best angle of each series of products can be obtained through experiments, and then assemble at the best angle to obtain the efficacy of optimal adjustment for each series of products.

Please refer to FIG. 15 for a third preferred embodiment of the electric tool of the present invention. This embodiment can have the structure shown in the aforementioned first or second preferred embodiment, and further separate the circuit unit of the control unit 6 into a first loop unit and a second loop unit that are electrically connected. The first loop unit includes a first circuit board 61 being a MOS circuit board with a surface disposed with the drive loop (first loop circuit), and a plurality of power switching elements being MOSFET transistors or IGBT transistors (not shown in the figure) installed on the drive loop of the first circuit board 61. The second loop unit includes a second circuit board 64 being a control board provided with the aforementioned control loop (second loop circuit). A tact switch 65 of the control unit 6 is provided on the grip 20 and electrically connected to the control loop, by pressing or releasing the tact switch 65 to start or stop the electric tool. In this embodiment, the first circuit board 61 and the second circuit board 64 are respectively disposed to be spaced apart on an upper side and a lower side of the tact switch 65.

In addition, since the power switching elements generate heat, one surface of the first circuit board 61 is adhered with a heat dissipation plate 62, such as a heat dissipation fin, by thermally conductive silicone rubber. The heat dissipation plate 62 and the thermally conductive silicone rubber facilitate heat dissipation of the first circuit board 61.

Figure 16:
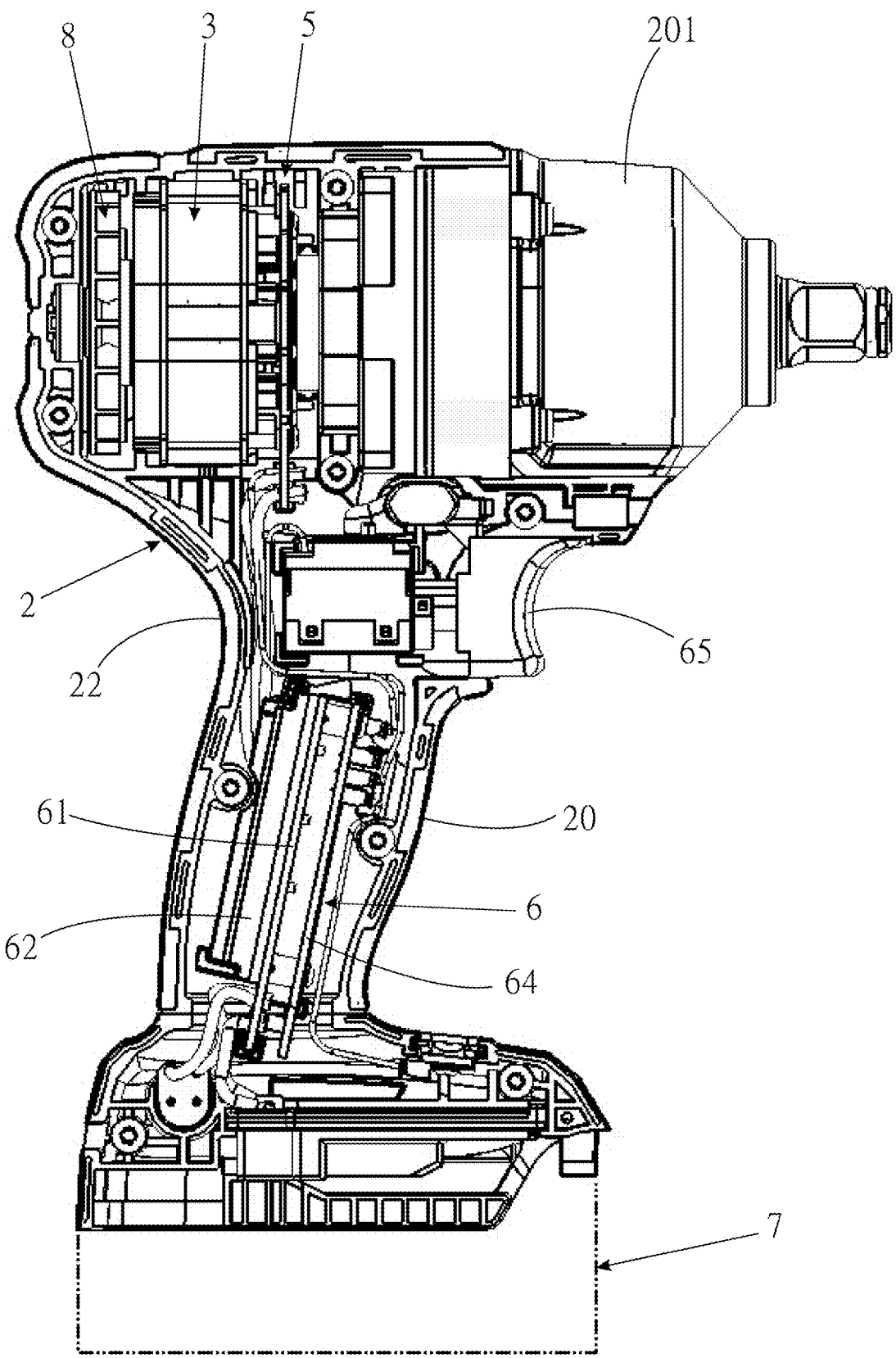
FIG. 16 is an incomplete view of a fourth preferred embodiment of the electric tool of the present invention.

FIG. 16 is a fourth preferred embodiment of the electric tool of the present invention. This embodiment is generally the same as the third embodiment, and the same components with the same reference numerals are used, which will not be repeated. In this embodiment, the control unit 6 is also configured as the independent, spaced-apart first circuit board 61 (with the drive loop) and second circuit board 64 (with the control loop). The two circuit boards 61, 64 are located at the grip 20 of the housing unit 2. More specifically, the two circuit boards 61, 64 are juxtaposed between the tact switch 65 and the battery unit 7.

In the third and fourth embodiments described above, the MOS board (i.e. the first circuit board) and the control board (i.e. the second circuit board) are disposed separately, on the one hand, it can more effectively dissipate heat from the power switching elements, and on the other hand, electronic components on the control board are kept far away from the power switching elements to avoid being affected by the heat of the power switching elements to ensure normal operation of the electronic components of the control board and longer service life.

Furthermore, since the control unit is made into the first and second circuit boards 61, 64, the heat dissipation plate 62 only needs to be made into a size of the first circuit board 61 (MOS board) to reduce volume and cost of the heat dissipation plate 62.

According to the present invention, the control unit 6 is made into the independent first circuit board 61 and second circuit board 64 with the advantage of capable of changing an installation position of the entity of the control unit 6 according to different types of batteries and an internal space of the electric tool. Taking FIG. 15 and FIG. 16 as examples, the battery unit 7 of FIG. 15 is a plug-in battery to be inserted at an end of the grip 20. For using such type of battery, an internal space of the grip 20 is relatively small and narrow, which is suitable for disposing the two circuit boards 61 and 64 on the upper side and the lower side of the tact switch 65 separately. The battery unit 7 of FIG. 16 is a sliding-type battery to be slidably installed at the end of the grip 20. The internal space of the grip 20 is relatively wide, which is suitable for disposing the two circuit boards 61 and 64 side by side in the grip 20.

According to the present invention, the Hall unit and the wiring circuit unit of the electric motor are separately disposed to achieve the object of improving the heat dissipation effect of the present invention. Moreover, the structural design of the present invention is also advantageous for adjusting the rotation speed of the electric motor, and thus adjusting the rotation output of the electric tool.

The electric motor disclosed in the present invention can be applied not only to electric tools, but also to other electric equipment or devices with rotary output, such as but not limited to, electric bicycles, electric motorcycles, electric lawn mowers, etc.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An electric motor including:
   a rotor with a rotating shaft;
   a stator surrounding the rotor, the rotor being capable of rotating in the stator;
   a coil module with a plurality of coils wound around the stator;
   a Hall unit including a Hall circuit board disposed around the rotating shaft of the rotor, and a Hall module disposed on the Hall circuit board and corresponding to the rotor and used to sense rotation of the rotor; and
   a wiring circuit unit independent of the Hall circuit board and including a three-phase power source interface, the wiring circuit unit being electrically connected to the coils and electrically connecting the coils to the power source interfaces respectively by groups;
   wherein the stator has a cylindrical yoke, a plurality of polar columns annularly disposed on an inner circumferential surface of the yoke, and a winding frame portion disposed at one end of the yoke; the coils of the coil module wind around the polar columns respectively; the coil module further has a surrounding portion connected to the coils and wound around the winding frame portion, and three wiring portions extending from the surrounding portion and serving as the power source interfaces respectively; the wiring circuit unit further includes a short-circuiting plate disposed on the winding frame portion, the short-circuiting plate contacts the surrounding portion to electrically connect the coils.

2. The electric motor as claimed in claim 1, wherein the wiring circuit unit includes a wiring circuit board independent of the Hall circuit board and surrounding the rotating shaft, and a wiring circuit provided on the wiring circuit board, the power source interfaces are disposed on the wiring circuit board, and the wiring circuit is electrically connected to the coils and electrically connects the coils to the power source interfaces respectively by groups.

3. The electric motor as claimed in claim 2, wherein the Hall circuit board and the wiring circuit board are disposed in inner and outer circles.

4. The electric motor as claimed in claim 3, wherein the wiring circuit board is disposed around an outer periphery of the Hall circuit board, and a gap is formed between the wiring circuit board and the Hall circuit board.

5. The electric motor as claimed in claim 1, wherein the coils, the surrounding portion, and the three wiring portions are formed by one wire.

6. The electric motor as claimed in claim 1, wherein a setting angle of the Hall circuit board can be adjusted.

7. The electric motor as claimed in claim 1, further comprising a first motor cover and a second motor cover cooperating with each other, and a motor space formed between the two motor covers, and the electric motor being installed in the motor space.

8. The electric motor as claimed in claim 7, wherein the Hall circuit board has a plurality of through holes, and further includes a plurality of positioning members respectively passing through the through holes and detachably connected to either the first motor cover or the second motor cover, and an extended length of each of the through holes around the rotating shaft is greater than a radial width of the corresponding positioning member.

9. The electric motor as claimed in claim 3, further comprising a first motor cover and a second motor cover cooperating with each other, a motor space formed between the two motor covers, and three conductive plates disposed on either the first motor cover or the second motor cover, and the three wiring portions being respectively electrically connected to the three conductive plates.

10. An electric tool including:
a housing unit;
a battery unit disposed at a lower side of the housing unit;
an electric motor disposed in the housing unit, and including a rotor with a rotating shaft, a stator surrounding the rotor, and a coil module with a plurality of coils wound around the stator;
a heat dissipation unit disposed corresponding to the electric motor;
a Hall unit spaced apart from the heat dissipation unit along a longitudinal direction of the rotating shaft, and including a Hall circuit board surrounding the rotating shaft and disposed in the housing unit, and a Hall module disposed on the Hall circuit board and corresponding to the rotor and used to sense rotation of the rotor;
a wiring circuit unit independent of the Hall circuit board and including a three-phase power source interface, the wiring circuit unit being electrically connected to the coils and electrically connecting the coils to the power source interfaces respectively by groups; and
a control unit disposed in the housing unit and electrically connected to the battery unit, the electric motor and the Hall unit, and located between the electric motor and the battery unit;
wherein the stator has a cylindrical yoke, a plurality of polar columns extending inwardly from an inner circumferential surface of the yoke, and a winding frame portion disposed at one end of the yoke along a longitudinal direction of the yoke, the coil module has the coils wound around the polar columns respectively, a surrounding portion connected to the coils and wound around the winding frame portion, and three wiring portions extending from the surrounding portion and serving as the power source interfaces respectively, the wiring circuit unit further includes a short-circuiting plate disposed on the winding frame portion, and the short-circuiting plate contacts the surrounding portion to electrically connect the coils.

11. The electric tool as claimed in claim 10, wherein the wiring circuit unit further includes a wiring circuit board independent of the Hall circuit board and surrounding the rotating shaft, and a wiring circuit provided on the wiring circuit board, the power source interfaces are disposed on the wiring circuit board, the wiring circuit is electrically connected to the coils and electrically connects the coils to the power source interfaces respectively by groups.

12. The electric tool as claimed in claim 10, wherein the housing unit includes a motor front cover and a motor rear cover that cooperates with the motor front cover to define a motor space for disposing the electric motor and the Hall unit, and the Hall circuit board is disposed inside either the motor rear cover or the motor front cover and corresponding to the rotor.

13. The electric tool as claimed in claim 12, wherein the housing unit further includes a plurality of positioning members penetrating the Hall circuit board and detachably connected to either the motor rear cover or the motor front cover, the Hall circuit board has a plurality of through holes for the positioning members to pass through, and an extended length of each of the through holes around the rotating shaft is greater than a radial width of the corresponding positioning member.

14. The electric tool as claimed in claim 10, wherein the housing unit includes a first housing, a second housing that cooperates with the first housing to define a disposition space for disposing the electric motor and the Hall unit, and a bracket disposed in the first housing and the second housing and provided for disposing the Hall circuit board.

15. The electric tool as claimed in claim 14, wherein the bracket has a ring-shaped main portion for disposing the Hall circuit board, and a plurality of bracket portions extending outwardly from the main portion and engaging in the first housing and the second housing.

16. The electric tool as claimed in claim 14, wherein the main portion of the bracket has a plurality of hook members, and the Hall circuit board has a plurality of grooves for engaging with the hook members respectively.

17. The electric tool as claimed in claim 10, wherein the control unit has a first loop unit and a second loop unit that are electrically connected, and the two loop units are disposed separately.

18. The electric tool as claimed in claim 17, wherein the housing unit has a grip located between the electric motor and the battery unit, a tact switch provided on the grip, and the first loop unit and the second loop unit are respectively located on an upper side and a lower side of the tact switch.

19. The electric tool as claimed in claim 17, wherein the housing unit has a grip located between the electric motor and the battery unit, a tact switch provided on the grip, and the first loop unit and the second loop unit are located between the tact switch and the battery unit.

20. The electric tool as claimed in claim 18, wherein the first loop unit includes a first circuit board, a drive loop, and a plurality of power switching elements disposed on the first circuit board; the second loop unit includes a second circuit board and a control loop to control the power switching elements of the first loop unit.

21. The electric tool as claimed in claim 19, wherein the first loop unit includes a first circuit board, a drive loop, and a plurality of power switching elements disposed on the first circuit board; the second loop unit includes a second circuit board and a control loop to control the power switching elements of the first loop unit.

22. The electric tool as claimed in claim 20, wherein one surface of the first circuit board is disposed with a heat dissipation plate.

23. The electric tool as claimed in claim 21, wherein one surface of the first circuit board is disposed with a heat dissipation plate.

* * * * *